Feb. 21, 1961  T. M. HERBERT  2,972,314
ANTI-TILT BOLSTER-MOUNTED BRAKES
Filed Oct. 14, 1959  2 Sheets-Sheet 1
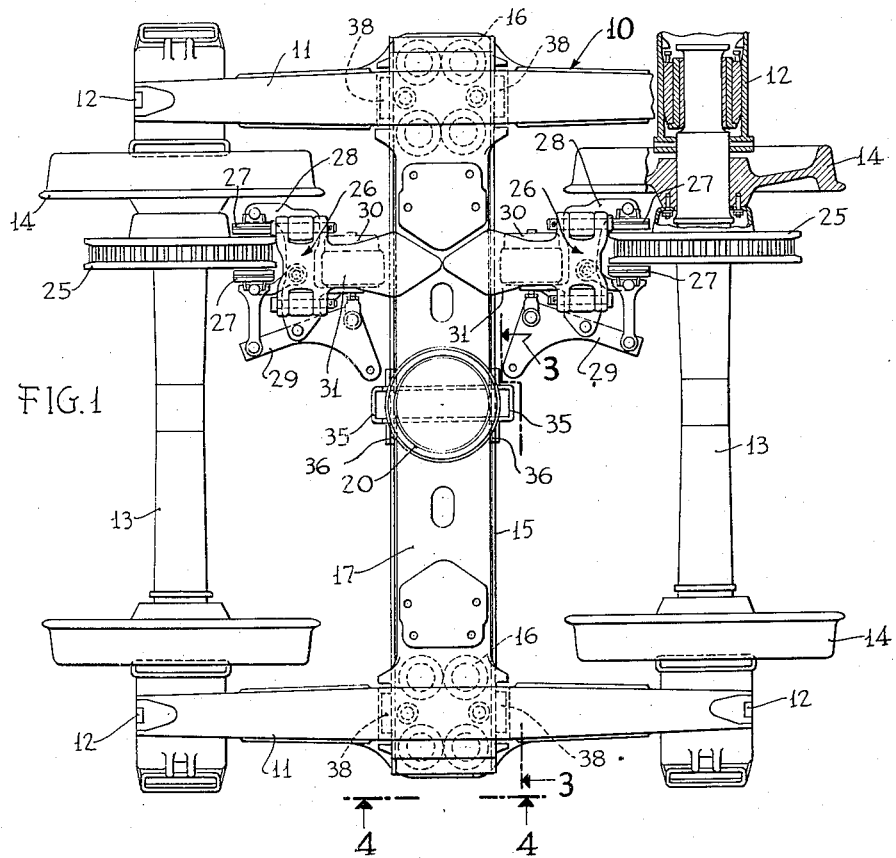
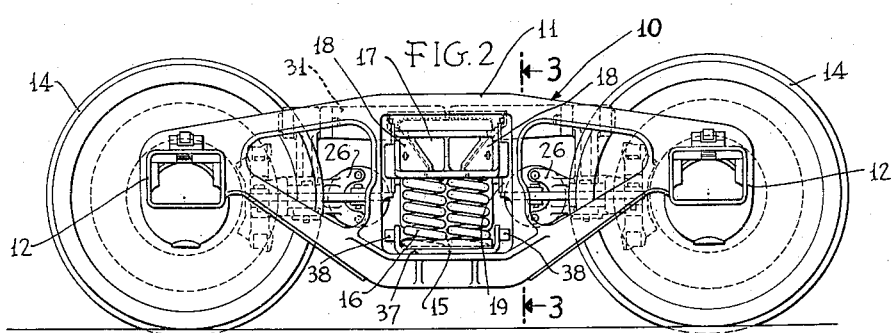
INVENTOR.
Thomas M. Herbert
BY
Wm. R. Glisson
ATTORNEY Feb. 21, 1961 T. M. HERBERT 2,972,314
ANTI-TILT BOLSTER-MOUNTED BRAKES
Filed Oct. 14, 1959 2 Sheets-Sheet 2
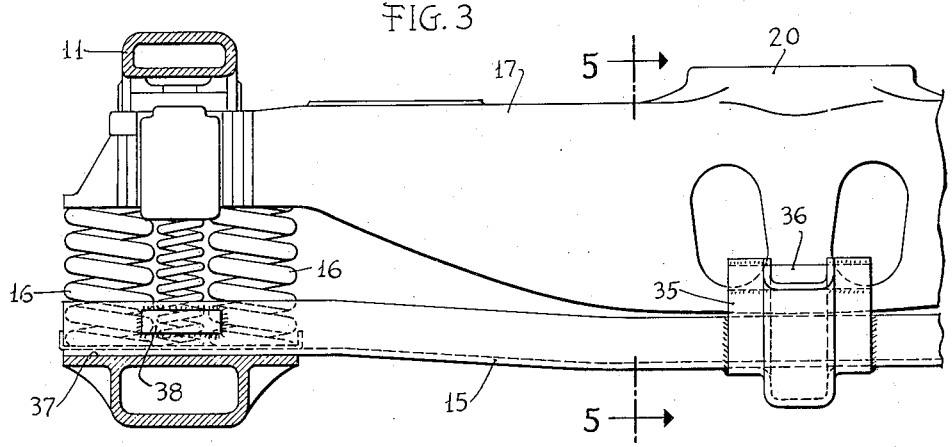
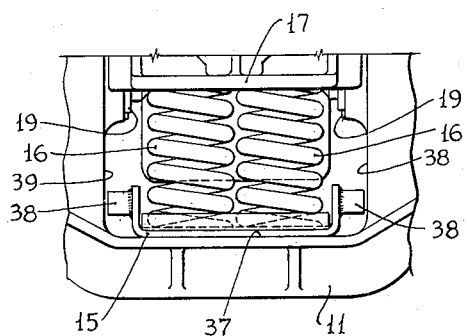
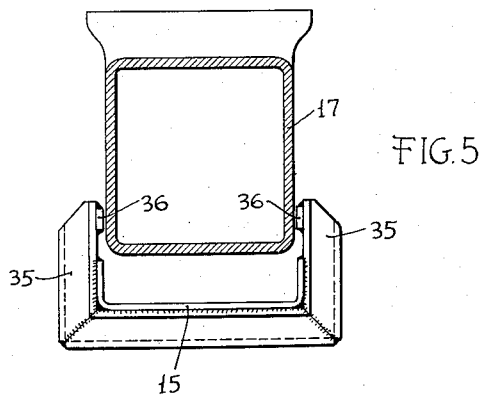
INVENTOR.
Thomas M. Herbert
BY
Wm. R. Glisson
ATTORNEY

United States Patent Office 2,972,314
Patented Feb. 21, 1961

2,972,314

ANTI-TILT BOLSTER-MOUNTED BRAKES

Thomas M. Herbert, Huntingdon Valley, Pa., assignor to The Budd Company, Philadelphia, Pa., a corporation of Pennsylvania Filed Oct. 14, 1959, Ser. No. 846,288

2 Claims. (Cl. 105—200)

This invention relates to bolster-mounted brakes and has for an object the provision of improvements in this art.

One of the particular objects of the invention is to provide means for stabilizing a truck bolster on which brakes are mounted to minimize tilting of the bolster when the brakes are applied.

Another object is to provide simple and inexpensive apparatus for reducing the tilting of the bolster.

The above and other objects of the invention and various features of novelty will be apparent from the following description of an exemplary embodiment, reference being made to the accompanying drawings, wherein:

Fig. 1 is a plan view of a truck embodying the present invention;

Fig. 2 is a side elevation;

Fig. 3 is a partial enlarged transverse vertical section taken on the line 3—3 of Figs. 1 and 2;

Fig. 4 is an enlarged partial end elevation taken on the line 4—4 of Fig. 1; and Fig. 5 is a longitudinal vertical section taken on the line 5—5 of Fig. 3.

The truck 10 with which the present invention was developed is a known type used in freight service and includes side frame members 11 having axle bearing boxes 12, wheel-axle units comprising axles 13 and wheels 14 fast thereon, a spring plank 15 supporting springs 16 thereon, and a bolster 17 mounted on the springs. The bolster 17 has friction slide means 18 engaging vertical guides 19 at the sides of spring-receiving openings in the side frames and also has a center pin bearing 20 for turnably supporting a car body.

This truck is basically designed for the use of wheel tread brakes operated by mechanism mounted on the side frames. Consequently, in such intended use the bolster is only required to move up and down in its guides in the side frames and to resist only the turning movement caused by inertia-generated movements between the car body and truck.

There is an increasing demand for disk brakes on freight car trucks such as this and the economics of the situation do not in all cases allow the procurement of new trucks designed for disk brakes.

A convenient place to mount the brake operating mechanisms is on the bolster of the truck but such an arrangement puts heavy turning loads on the bolster which cause it to tilt about a transverse horizontal axis. The mountings are such that this tilting movement is permitted but it allows the brake shoes to shift out of effective position or at times move off the braking disk entirely and it also causes the friction slides to bind in their guides to such an extent that the bolster does not function properly for its intended purposes.

Herein there is shown a disk brake installation comprising disks 25 rigidly mounted on the wheels 14 and brake operating mechanisms 26 mounted on opposite sides of one end of the bolster. The details of this installation are not important herein but the drawings show lined brakes shoes 27 carried by frames 28 and levers 29 and actuated by fluid power devices 30. The frames 28 are swingably and turnably suspended by brackets 31 rigidly attached to the bolster, as by welding.

According to the present invention means are providing for transferring turning loads from the bolster 17 to the spring plank 15. As originally provided on the truck, there is no connection between the spring plank and the bolster except through the springs 16. Hereby the spring plank and bolster are provided with interacting means for resisting the turning movement while allowing required vertical movements between them, the means herein shown including rigid upstanding side yoke members 35 secured to the spring plank and guide wear bars 36 carried by the side yoke members in position to engage the sides of the bolster when it tilts. These reaction elements are placed as close as conveniently possible to the brake mechanism locations.

The spring plank as originally provided has considerable longitudinal movement on its seats 37 in the openings in the side frame members. To limit this longitudinal movement and to cause the spring plank to take the turning reaction, the spring plank is provided at each end on the sides with stop blocks 38 which stand close to the guide surfaces 39 and prevent the spring plank from shifting unduly in a longitudinal direction.

The reaction arrangement thus provided acts like a lever arm about the axis of tilting movement and holds the bolster to a limited movement in either direction from a medial position when the brakes are applied.

It is thus seen that the invention provides simple, efficient and economical means for limiting the turning movement of the bolster when the brakes are applied.

While certain embodiments of the invention have been specifically described for purposes of illustration, it is to be understood that there may be various embodiments and modifications within the general scope of the invention.

What is claimed is:

1. A railway truck comprising in combination, side frames, wheel-axle units turnably mounted in said side frames, a spring plank mounted at its ends on seats between spaced vertical guides at openings in said side frames, springs carried by said spring plank, a bolster mounted on said springs in said openings and having vertical movement along said spaced guides, brake operating means mounted on said bolster, means at the ends of said spring plank limiting longitudinal shifting on its end seats, and vertically extending guide and reaction means between said spring plank and said bolster which limit the turning movement of the bolster by reaction against the spring plank when the brakes are applied.

2. A railway truck as set forth in claim 1, wherein said guide and reaction means comprise upstanding yoke guides carried by the spring plank on the sides of the bolster.

References Cited in the file of this patent

UNITED STATES PATENTS 1,650,173    Akitt _____ Nov. 22, 1927